United States Patent
Sahyoun

(10) Patent No.: US 7,768,160 B1
(45) Date of Patent: Aug. 3, 2010

(54) ELECTROMAGNETIC MOTOR TO CREATE A DESIRED LOW FREQUENCY VIBRATION OR TO CANCEL AN UNDESIRED LOW FREQUENCY VIBRATION

(76) Inventor: Joseph Y. Sahyoun, 3031 Hopkins Ave., Redwood City, CA (US) 94062

( * ) Notice: Subject to any disclaimer, the term of this patent is extended or adjusted under 35 U.S.C. 154(b) by 100 days.

(21) Appl. No.: 12/287,924

(22) Filed: Oct. 15, 2008

Related U.S. Application Data

(63) Continuation-in-part of application No. 11/086,216, filed on Mar. 21, 2005, now Pat. No. 7,449,803.

(51) Int. Cl.
*H02K 41/00* (2006.01)

(52) U.S. Cl. ............................. 310/14; 310/23

(58) Field of Classification Search ............. 310/12.02, 310/12.07, 13, 14, 23, 30, 34
See application file for complete search history.

(56) References Cited

U.S. PATENT DOCUMENTS

| | | |
|---|---|---|
| 2,108,775 A | 2/1938 | MacGeorge |
| 2,167,078 A | 7/1939 | Lakatos |
| 3,024,374 A | 3/1962 | Stauder |
| 3,070,730 A | 12/1962 | Gray et al. |
| 3,105,153 A | 9/1963 | James, Jr. |
| 3,119,940 A | 1/1964 | Pettit et al. |
| 3,129,347 A | 4/1964 | Tognola |
| 3,582,875 A | 6/1971 | Van Wambeck et al. |
| 3,728,654 A | 4/1973 | Tada |
| 3,859,547 A | 1/1975 | Massie |
| 3,891,874 A | 6/1975 | Roters et al. |
| 3,980,908 A | 9/1976 | McClintock |
| 4,127,835 A * | 11/1978 | Knutson .............. 335/266 |
| 4,381,181 A | 4/1983 | Clegg |
| 4,439,700 A | 3/1984 | Menzel et al. |
| 4,542,311 A | 9/1985 | Newman et al. |
| 5,017,819 A | 5/1991 | Patt et al. |
| 5,231,336 A | 7/1993 | van Namen |
| 5,335,284 A | 8/1994 | Lemons |

(Continued)

OTHER PUBLICATIONS

May 31, 2007, Non-final Office Action, U.S. Appl. No. 11/086,216.

(Continued)

*Primary Examiner*—Dang D Le
(74) *Attorney, Agent, or Firm*—Allston L. Jones; Peters Verny, LLP

(57) ABSTRACT

Electromagnetic motor with a slider that moves linearly with respect to the stator in either direction. Embodiments include slider internal or external the stator. Slider includes one magnetic flux producing element in all embodiments. Internal slider embodiments stator includes a minimum of three magnetic flux producing elements and a maximum of four such elements. External slider embodiments stator includes two magnetic flux producing elements. All embodiments provide positive slider return to center at rest position. In internal slider embodiments the slider is centered within the stator resulting from either: a combination of a repelling force from a single magnetic flux producing element in opposition to gravitational pull on the slider due to its weight; or equal and opposite repelling forces on opposite sides of the stator from a magnetic flux producing element on opposite sides of the stator all three elements in longitudinal alignment with each other.

33 Claims, 14 Drawing Sheets

U.S. PATENT DOCUMENTS

| | | |
|---|---|---|
| 5,365,210 A | 11/1994 | Hines |
| 5,424,592 A | 6/1995 | Bluen et al. |
| 5,896,076 A | 4/1999 | van Namen |
| 5,973,422 A | 10/1999 | Clamme |
| 6,201,329 B1 | 3/2001 | Chen |
| 6,225,713 B1 | 5/2001 | Hattori et al. |
| 6,326,706 B1 | 12/2001 | Zhang |
| 6,894,408 B2 | 5/2005 | Godkin |
| 7,157,815 B2 | 1/2007 | Cordiale et al. |
| 7,449,803 B2 | 11/2008 | Sahyoun |

OTHER PUBLICATIONS

Dec. 20, 2007, Final Office Action, U.S. Appl. No. 11/086,216.
Dec. 18, 2008, Non-final Office Action, U.S. Appl. No. 11/513,743.

* cited by examiner

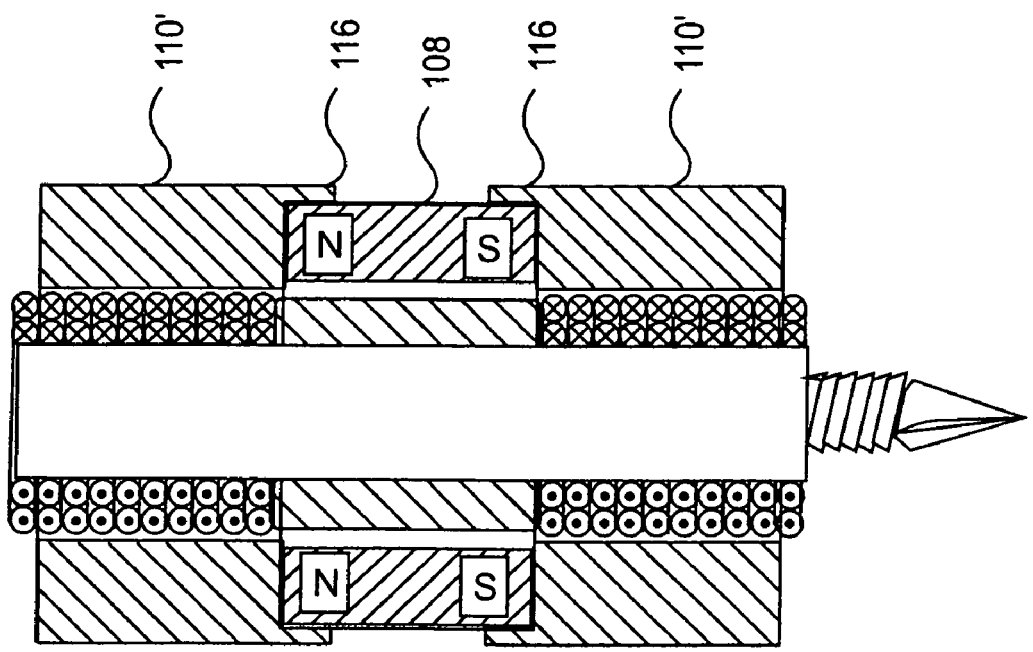
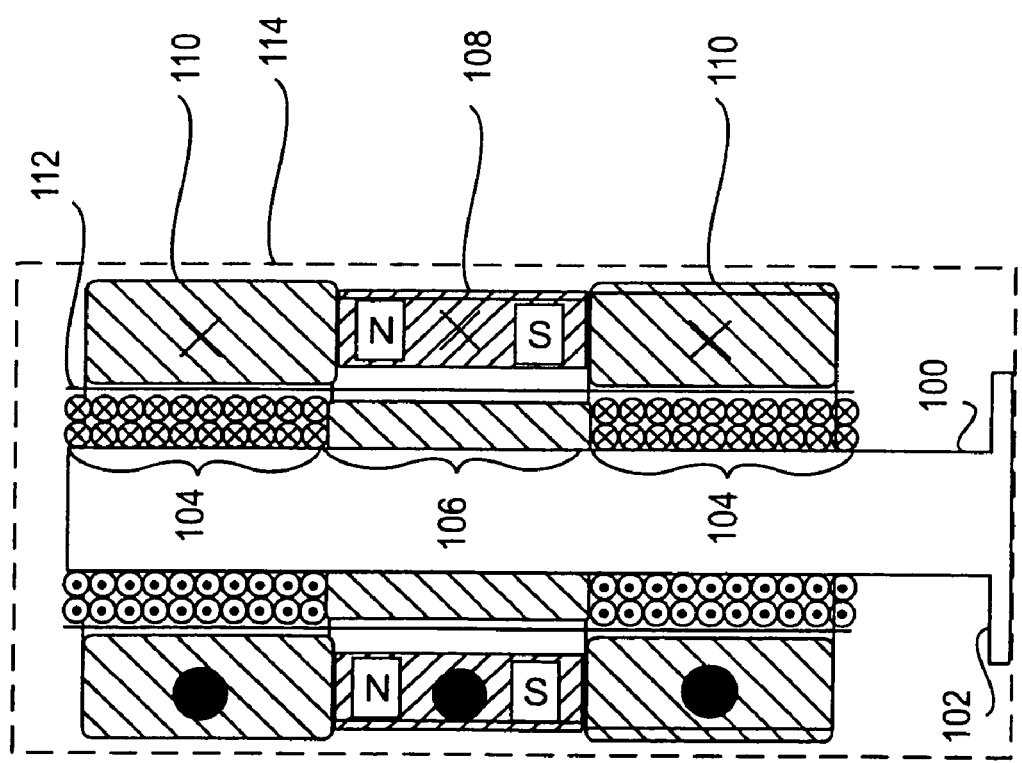

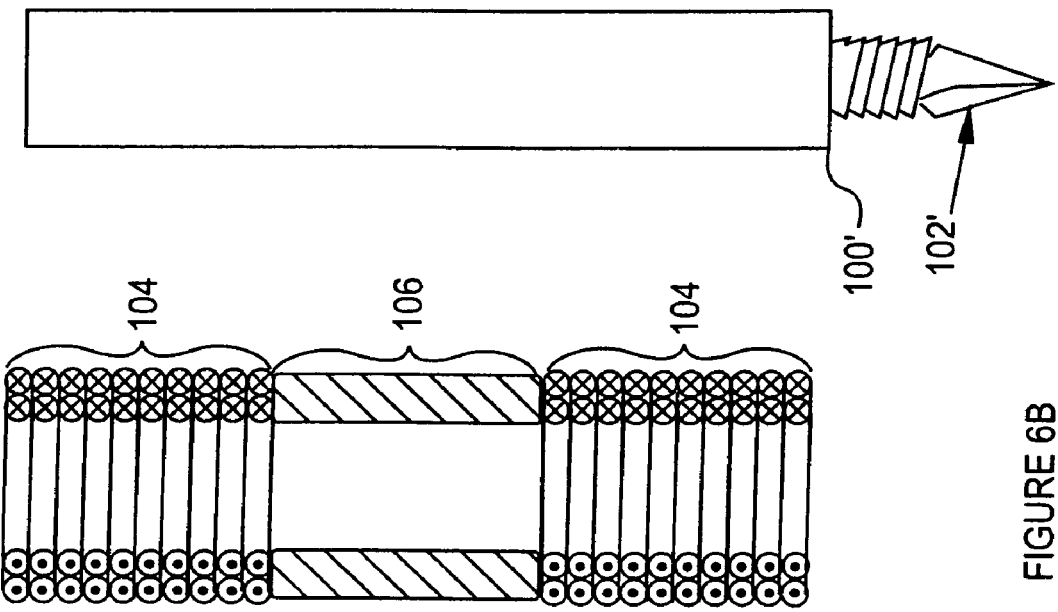
FIGURE 6A
FIGURE 6B
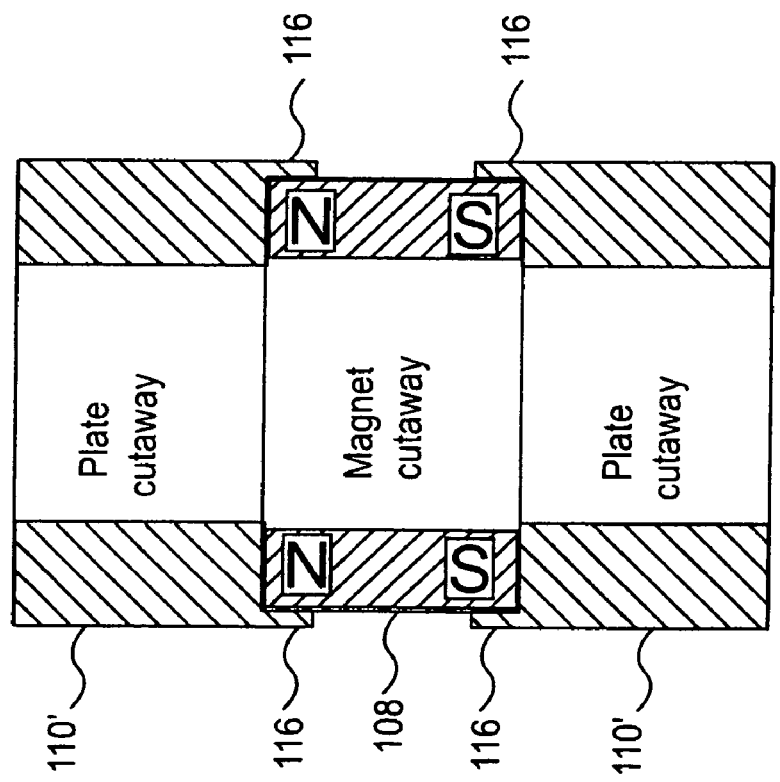
FIGURE 6C

ELECTROMAGNETIC MOTOR TO CREATE A DESIRED LOW FREQUENCY VIBRATION OR TO CANCEL AN UNDESIRED LOW FREQUENCY VIBRATION

CROSS-REFERENCE

This application is a Continuation-In-Part application from the application having Ser. No. 11/086,216 filed Mar. 21, 2005 by the same inventor and having the same title.

BACKGROUND OF THE INVENTION

1. Field of the Invention

The present invention relates to a linear stroke electromagnetic motor having a free moving internal mass that is caused to move selectively by the application of electrical signals to create an electromagnetic force on the free moving internal mass to produce a desired low frequency sound or strong variable vibration or to drive a solenoid like apparatus proportionally to the applied signal.

2. Description of the Prior Art

The prior art includes various linear stroke electromagnetic motors. An early such device is disclosed in U.S. Pat. No. 4,542,311 (hereinafter '311), issued Sep. 17, 1985 and entitled LONG LINEAR STROKE RECIPROCATING ELECTRIC MACHINE. This device includes a cylindrical air gap defined between outer and inner gaps defining surfaces, at least one of which has a length equal to the length of an electric coil plus the length of the stroke. Additionally it includes a flux focusing ring, having a length in the direction of movement equal to the length of the coil in the same direction, that concentrates substantially all the field flux and all of the electric coil turns to interact over the entire stroke.

Another device is disclosed in U.S. Pat. No. 5,231,336 (hereinafter '336), issued Jul. 27, 1993 and entitled ACTUATOR FOR ACTIVE VIBRATION CONTROL. Disclosed here is a device that may have either a moving coil or a moving magnet with the moving element undergoing reciprocal motion in response to an electrical input signal. The device described in U.S. Pat. No. '336 employs a centering shaft that extends through the center of the actuator to radially center the moving element. Additionally, the longitudinal return force on the moving element depends on mechanical springs that are located around each end of the centering shaft. The use of springs in this design, requires frequent service as the spring constant tends to change with time. Additionally, as the moving element moves the springs tend to make noise that is audible when the actuator is in use making application of this device unacceptable in an audio system as a low frequency radiator. Also, if the actuator is mounted vertically with the centering shaft oriented vertically, the weight of the moving element will exercise an uneven load on the springs. The weight of the moving element thus will cause the moving element to partially compress the lower spring and cause the moving element to assume a position that is lower than the desired centered position when at rest; which causes the magnet and the actuation coil (voice coil in audio applications) to be offset one from the other. This misalignment will create heat, reduction of performance and possibly destruction of the actuator.

Another representative prior art publication is U.S. Pat. No. 5,424,592 (hereinafter '592), issued Jun. 13, 1995 and entitled ELECTROMAGNETIC TRANSDUCER. Disclosed here is an electromagnetic actuator that includes a first assembly, a second assembly disposed for relative movement with respect to the first assembly and at least a first flexure interconnecting the first assembly and the second assembly. The first assembly includes a core having a first magnetic pole of a first polarity and a second magnetic pole of a second polarity. The second assembly includes a conductive electric coil having a first coil portion and a second coil portion. The first magnetic pole is in a facing relationship with the first coil portion and the second magnetic pole is in a facing relationship with the second coil portion. The first coil portion and the second coil portion are arranged so that an electrical current in the coil develops additive flux current products at each of the first coil portion and the second coil portion. Further one of the first assembly and the second assembly includes a magnetic flux return path between the first coil and the second coil portion. The "flexure" in this design in simple terms is a spring and thus this design has problems that are similar to those described above with respect to U.S. Pat. No. '336.

A fourth representative prior art publication is U.S. Pat. No. 5,973,422 (hereinafter '422), issued Oct. 26, 1999 and entitled LOW FREQUENCY VIBRATOR. The device disclosed here has a stator member with a cylindrical, central chamber, a cylindrical tubular liner of low friction, non-ferromagnetic material positioned in the chamber to form a bearing and a cylindrical, ferromagnetic, reciprocating piston slidably mounted in the liner. The stator has a pair of coils and a permanent magnet positioned centrally in the reciprocating piston. A ferromagnetic flux conductor surrounds the coils and extends between opposite ends of the chamber. This configuration creates a magnetic spring having a spring constant K with the ratio of K to the mass M of the reciprocating member, made substantially equal to the square of a radian frequency in the operating frequency range of the vibrator.

The preferred design disclosed by U.S. Pat. No. '442 depends on a metal or ferrite material being installed on the stator to center the slider. The metal on the stator and the magnet of the moving slider have the strongest force at rest. During operation, signals of lower force amplitude than the force that holds the slider in its stationary position are ignored. For example, if the ferrite and the magnet are held in position by a 10 lbs. force, signals that produce force amplitudes of 1 lbs. and up to 9.99 lbs. will tend to be ignored. An 11 lbs. force will lead to an acceleration that is not proportional to the input signal. These render this design a mere solenoid with an output of ON or OFF. Once again this design does not address centering during vertical mounting as gravity will offset the center slider causing it to have very poor performance, heat up and then malfunction.

These and other previous designs each include drawbacks to various applications of the device disclosed. Some require centering rods, and springs to bring the slider back to its neutral position. These complex designs produce spring noise, spring fatigue and require a complex assembly. Other designs to help center the slider included a ferrous ring fastened on the outside of the stator in between the two coils wherein the widths of the ferrous ring and the slider magnet have to be equal for precise centering. That design suffers from short strokes since the excursion of the slider is directly related to the distance between the coils. Another weakness of prior art designs is that they do not offer linear resistance to the slider throughout the path of movement, i.e., the further the slider travels from the center position, the less resistance there is in the direction of movement. These designs only help centering of the slider when in the non-actuated position with the vibration that they produce being non linear and devices designed in these ways simply providing little more than on-off type compliance.

The desired design is one that produces linear excursion as the slider floats freely throughout its travel between the terminating magnets and has fewer limitations produced by the centering technique employed when the slider is in the non-activated position whether the electromagnetic motor is mounted horizontally, vertically, or at any other angle. The present invention provides such advantages.

SUMMARY OF THE INVENTION

The electromagnetic motor of the present invention is designed with a slider that moves linearly with respect to the stator in both directions. Embodiments of the present invention include those with a slider internal to the stator as well as embodiments with the slider external to the stator. In each of the embodiments, the slider includes one magnetic flux producing element: either a coil capable of producing a constant magnetic flux or a magnet each have the magnetic flux oriented longitudinally relative to the stator.

The stator, in embodiments with the slider internal the stator, includes a minimum of three magnetic flux producing elements and a maximum of four such elements. The stator, in embodiments with the slider external the stator, include two magnetic flux producing elements. All embodiments provide positive slider return to a center rest position. In internal slider embodiments the slider is centered within the stator resulting from either: a combination of a repelling force from a single magnetic flux producing element in opposition to gravitational pull on the slider due to its weight; or equal and opposite repelling forces on opposite sides of the stator from a magnetic flux producing element on opposite sides of the stator with all three elements in longitudinal alignment with each other.

BRIEF DESCRIPTION OF THE FIGURES

FIG. 5D is a longitudinal cross-section assembled view of the fifth embodiment of FIGS. 5A-C;

FIGS. 6A-C collectively are a longitudinal cross-section exploded view of a sixth embodiment of the present invention that is similar to the embodiment of FIGS. 5A-D with FIG. 6A being the mounting post, FIG. 6B being the stator that fits around the mounting post and FIG. 6C being the slider that fits around the stator;

FIG. 6D is a longitudinal cross-section assembled view of the sixth embodiment of FIGS. 6A-C;

DETAILED DESCRIPTION OF THE PRESENT INVENTION

The present invention pertains to a low frequency oscillating transducer that is capable of producing low frequency sounds along with strong vibrations that has application as a low frequency transducer that extends the frequency response of a loudspeaker below the audible range without producing other mechanical sounds when in use. Examples of other applications for the present invention are as a vibration actuator: e.g., to interactively shake a theater seat, in synchronization with a movie to increase the perceived special effect of the movie; to interactively vibrate a video game controller in synchronization with a video game during play; etc. There are also many applications for the present invention as a vibration cancelling device in situations where vibration is undesirable. To cancel the undesirable vibration the electromagnetic motor of the present invention is oriented with the axis of movement of the slider parallel to the axis of the vibration to be cancelled, then a selected signal of a variable pattern and variable strength is applied to the electromagnetic motor that produces an opposing vibration of the same pattern and of equal strength in the opposite direction to that of the undesirable vibration to effectively cancel the undesirable vibration to provide stability for a machine or other device.

The present embodiments provide a completely balanced magnetic circuit that produces strong linear vibration without any byproducts of axial vibration. This design also uses fewer moving parts than prior art embodiments. In the present embodiments the moving mass is centered by linear and balanced magnetic forces.

The embodiments of this invention deal with two main systems; a stationary system that is referred to herein as the "stator", and a moving system that is referred to herein as the "slider". There are embodiments of the present invention where the slider is internal to the stator as well as embodiments where the slider is external to the stator.

Figure 1:
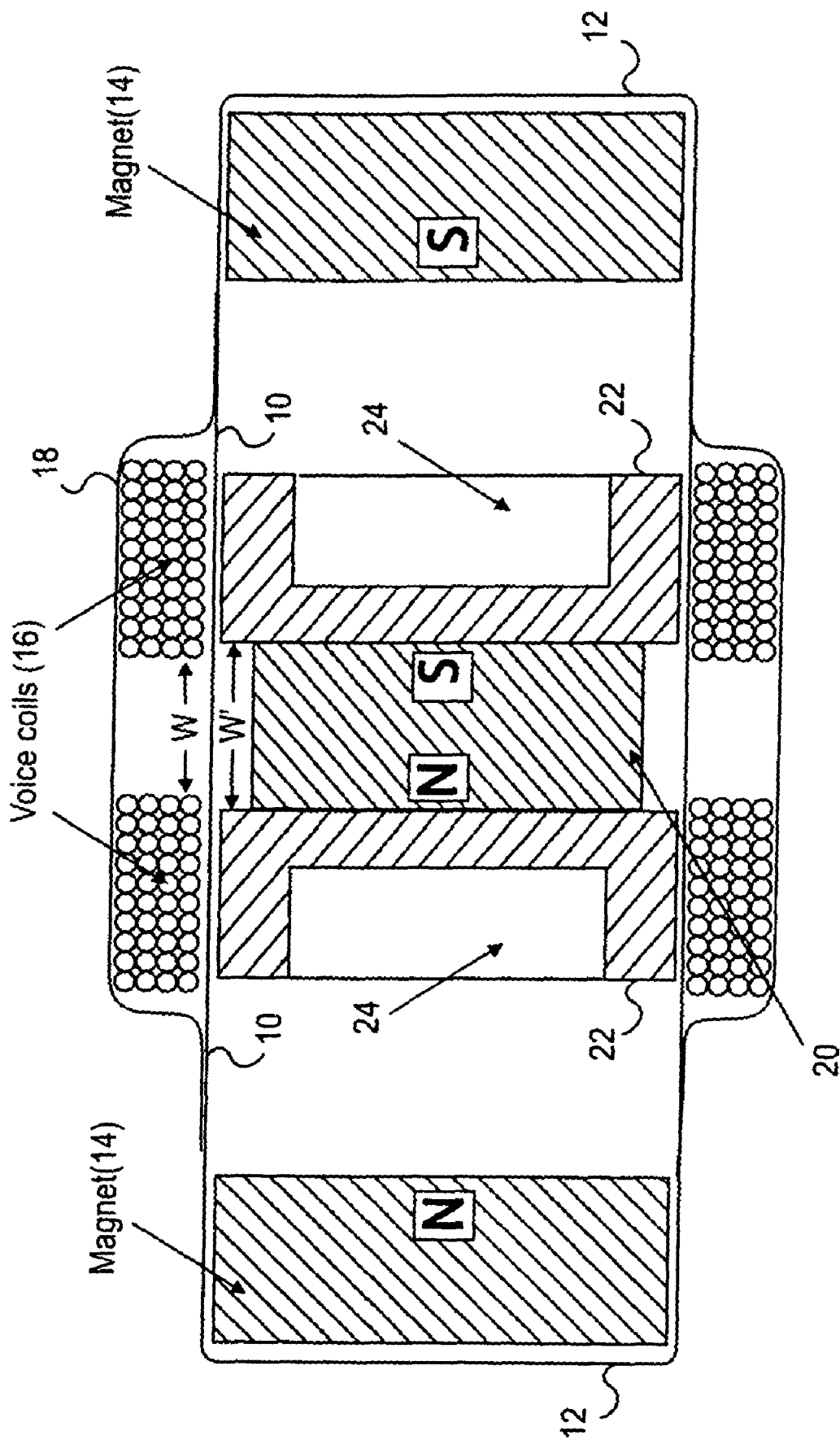
FIG. 1 is a longitudinal cross-section of a basic embodiment of the present invention.

FIG. 1 is a longitudinal cross-section of a basic embodiment of an electromagnetic motor of the present invention. The stator of the electromagnetic motor of FIG. 1 includes a tube 10 of a non-ferrous (non-magnetic) material that has a selected length and inner diameter. At opposite ends of tube 10 is an end cap 12 that closes the ends of tube 10. Internal at each end of tube 10 and fastened to each of end caps 12 is a circular magnet 14 (while the magnets shown in this figure are disks, they could alternatively be the type of magnet that has a hole in the center) that is sized to fit within tube 10 having a diameter that is slightly smaller than the inner diameter of tube 10. As shown in FIG. 1, one of magnets 14 has the N (north) pole facing into tube 10 (left side) and the other magnet 14 has the S (south) pole facing into tube 10 (right side). Additionally, wound around the outside of tube 10 are two electrically conductive coils 16 (i.e., inductors) each spaced apart from the longitudinal center of tube 10 substantially the same selected distance (i.e., spaced apart from each other around the longitudinal center of tube 10). Also shown in FIG. 1 is an optional non-magnetic, non-electrically conductive cover 18 that encircles both coils 16 and closes with tube 10 on opposite sides of the two coils 16 (e.g., shrink tubing). Cover 18 provides a dust cover and electrical insulation to the outer layers of coils 16.

The slider of FIG. 1 is internal to tube 10 and includes a third circular magnet 20 that has a diameter that is shown here as being smaller than the internal diameter of tube 10, however, magnet 20 could have a diameter that is slightly smaller than the inner diameter of tube 10. Centered on each face of magnet 20 there is a magnetically conductive plate 22 (a ferrous material such as steel) with each of plates 22 having an outer diameter that is smaller than the internal diameter of tube 10. So that the slider that includes magnet 20 and plates 22 moves freely within tube 10 without coming into contact with the inner surface of tube 10 as the slider moves, the outer diameter of each of plates 22 is smaller than the inner diameter of tube 10. The magnetic orientation of magnet 20, with respect to end magnets 14, has the N pole facing left toward the end magnet 14 with its N pole facing inward, and the S pole of magnet 20 is facing right toward the end magnet 14 having its S pole facing inward. By orienting end magnets 14 to face the like pole of slider magnet 20, a repelling force between slider magnet 20 from each of end magnets 14 is created to repel the slider to return to the center position.

The magnetic strength of end magnets 14 are selected to be substantially equal to each other and sufficiently strong to center the slider in tube 10 when the slider is at rest as shown in FIG. 1. The relationship between the strength of end magnets 14 and slider magnet 20 depends on various factors (e.g., total mass of the slider, the desired damping incorporated in the electromagnetic motor, and the degree of free motion of the slider that is desired). In an over damped situation the strength of end magnets 14 should be greater than, or equal to the strength of slider magnet 20; in a critically damped situation all three magnets should have substantially the same strength; and in an under damped situation the strength of the slider magnet should be greater than the strength of the end magnets.

From FIG. 1 it can also be seen that coils 16 are positioned to be opposite a corresponding plate 22 of the slider when no power is applied to coils 16; that is the spacing between coils 16 is substantially equal to the width of slider magnet 20. Also to optimize the magnetic coupling between each of plates 22 and the corresponding one of coils 16, each of plates 22 can be formed to have a "squared C" cross-sectional shape as shown in FIG. 1 (i.e., cup shaped with a hollow center area 24 of a selected depth and diameter) thus concentrating the magnetic field of slider magnet 20 around the interior surface of tube 10 and closer to coils 16.

The slider is caused to move by applying electrical signals to coils 16. For purposes of this discussion the pole orientation of the various magnets shown in FIG. 1 is assumed. To move the slider to the left, the electrical signal applied to both of coils 16 creates an electromagnetic field having an S pole which attracts the N pole on the left of magnet 20 and repels the S pole on the right of magnet 20, with the distance to the left that the slider moves being a function of the strength of the electromagnetic fields created by the electrical signal applied to coils 16 as well as the strengths of end magnets 14 and slider magnet 20. To cause movement of the slider to the right, a signal of the opposite polarity to that that caused movement to the left is applied to coils 16. Thus by varying the pattern and amplitude of the signal applied to coils 16, the slider can be caused to move in a desired pattern speed and distance. Any movement of the slider from the center position meets with resistance from the end magnet 14 in direction of movement in an effort to return the slider to the center position.

The closer the slider gets to an end of tube 10, the more resistance it faces from magnet 14 at that end of tube 10. The force of that resistance is proportional to the traveled distance of the slider from the center (rest) position. As the driving signal on coils 16 changes direction, the direction of travel of the slider also changes. The movement in the changed direction is then resisted similarly to that in the opposite direction as the slider approaches magnet 14 at the opposite end of tube 10. The relationship in either direction is totally proportional to the movement of the slider and therefore the movement or vibration is a mirror of the signal applied to coils 16. During oscillation, end magnets 14 can be designed to offer just the right amount of resistance to help repel the slider back to its original center position (part of that force comes from the electromagnetic field reversal provided when the signal direction is reversed in coils 16). End magnets 14 offer the centering feature as well as a linear force-strain resistance as the slider approaches the corresponding end of tube 10. During movement, the slider is continuously resisted by a repelling force from both end magnets 14 with that force being inversely proportional to the distance between the slider and the corresponding end magnet 14. That is the repelling force from the end magnet 14 being approached increases and at the same time the repelling force from the end magnet 14 that the slider is moving away from is decreasing. Since end magnets 14 have substantially the same strength, the repelling force from each end magnet 14 varies linearly in both directions. As the signal amplitude applied to coils 16 increases, the slider shifts to one side or the other, loading the magnetic spring that is produced by the similar poles of slider magnet 20 and the end magnet 14 being approached as the distance between those two magnets grows shorter.

Figure 2:
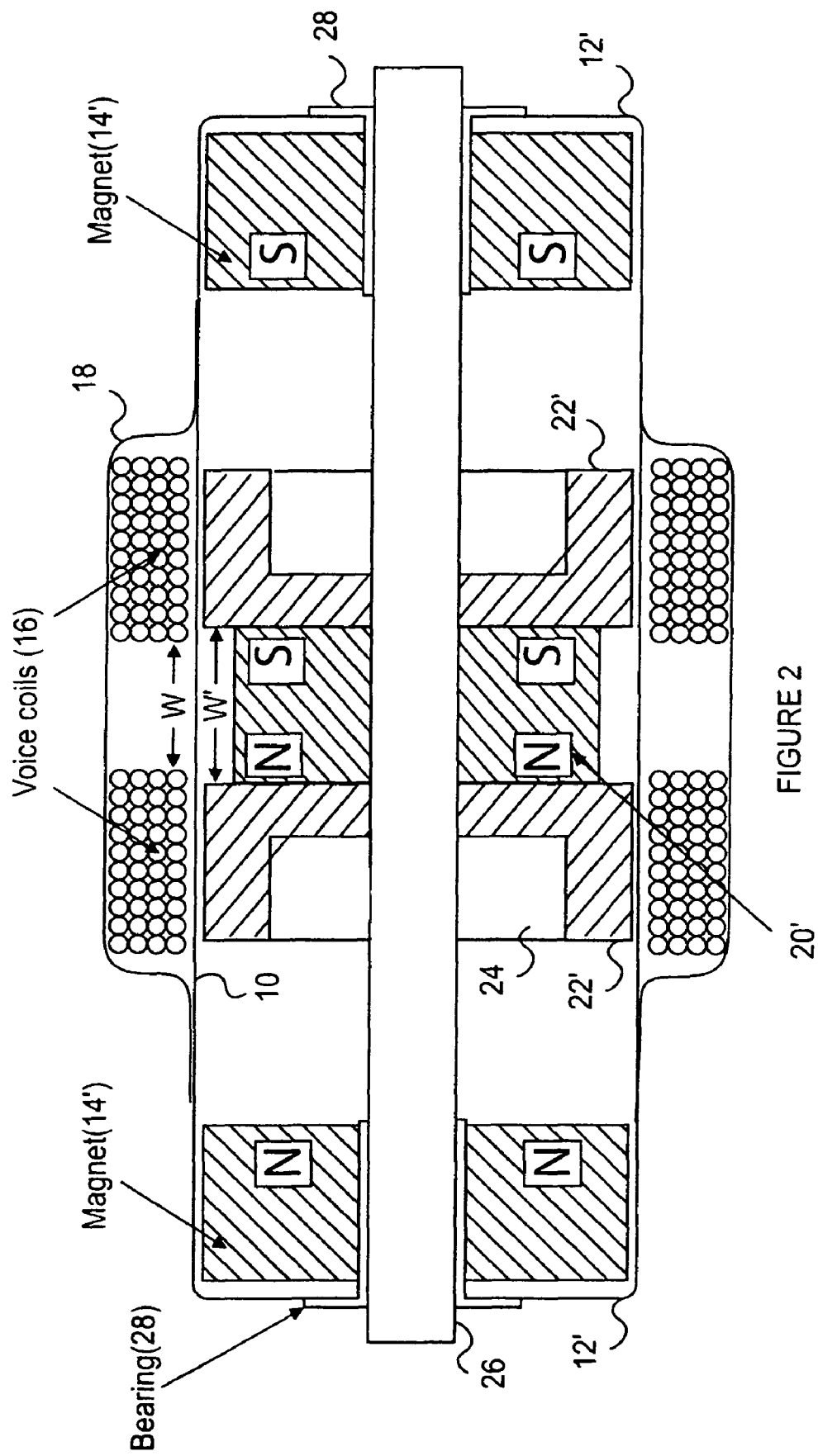
FIG. 2 is a longitudinal cross-section of a second embodiment of the present invention that is similar to the embodiment of FIG. 1.

In FIG. 2 there is shown a second embodiment of the present invention. This embodiment is similar to that of FIG. 1 and each of the items that are the same have the same reference number. Here each of the end caps 12', end magnets 14', slider magnet 20' and plates 22' have a hole through the longitudinal center. Passing through the hole in the center of each of those items is non-ferrous (non-magnetic) rod 26. Additionally there is a bearing in the center hole of end caps 12' and magnets 14' with rod 26 passing through bearings 28. The slider (magnet 20' and plates 22') is attached to rod 26. With rod 26 being centered and passing through the slider, the slider will always be centered in the diameter of tube 10 and thus be prevented from coming into contact with the inner surface of tube 10 when in motion or at rest.

The overall length of rod 26 depends on the width of slider magnet 20' and the width of end magnets 12'. The minimum length of rod 26 must be greater than the distance between end caps 12' plus twice the width of the wider of slider magnet 20' or end magnets 14' so that when one end of rod 26 extends out from one of end caps 12' the second end of rod 26 has not come free of the hole though magnet 14' at the end of tube 10 from which rod 26 is not extending or is the shortest.

Thus if tube 10 is being held in a fixed position, then rod 26 moves with the slider when coils 16 are energized. Alternatively, if either or both ends of rod 26 are attached to a fixed location when a signal is applied to coils 16 the slider becomes the stator and the stator becomes the slider. Stated another way, tube 10, end caps 12' and magnets 14' physically move relative to the external point(s) to which rod 26 is fixed with rod 26, magnet 20' and plates 22' remaining fixed relative to the point(s) of attachment of rod 26.

Figure 3:
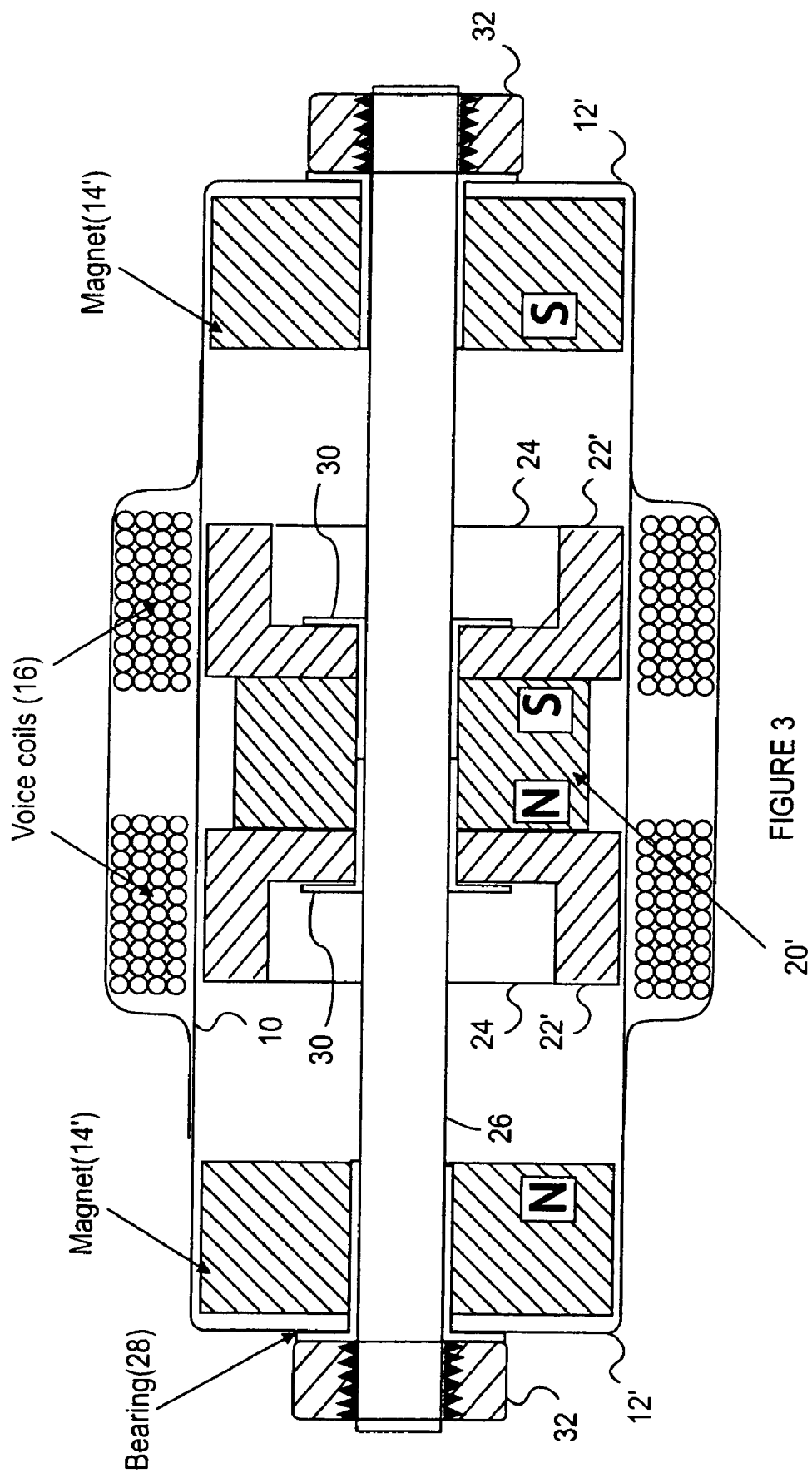
FIG. 3 is a longitudinal cross-section of a third embodiment of the present invention that is similar to the embodiment of FIG. 2.

Referring next to FIG. 3 there is shown a longitudinal cross-section of a third embodiment of the present invention. This embodiment is similar to that of FIG. 2 with the difference being that magnet 20' and plates 22' are not affixed to rod 26 and thus able to move on rod 26 when coils 16 are energized; while at the same time the ends of rod 26 are threaded with nuts 32 being tightened to contact each of end caps 12'. To reduce wear on non-ferrous rod 26 a bearing 30 can be added around rod 26 and extending into the center holes of magnet 20' and plates 22'. In this configuration the result is the same regardless whether tube 10 is fastened to a fixed point external tube 10 or rod 26 is fastened to a fixed point external to tube 10 since nuts 32 prevent rod 26 from moving relative to tube 10. Therefore when coils 16 are energized only slider magnet 20' and plates 22', magnetically attached thereto, move relative to tube 10.

Figure 4:
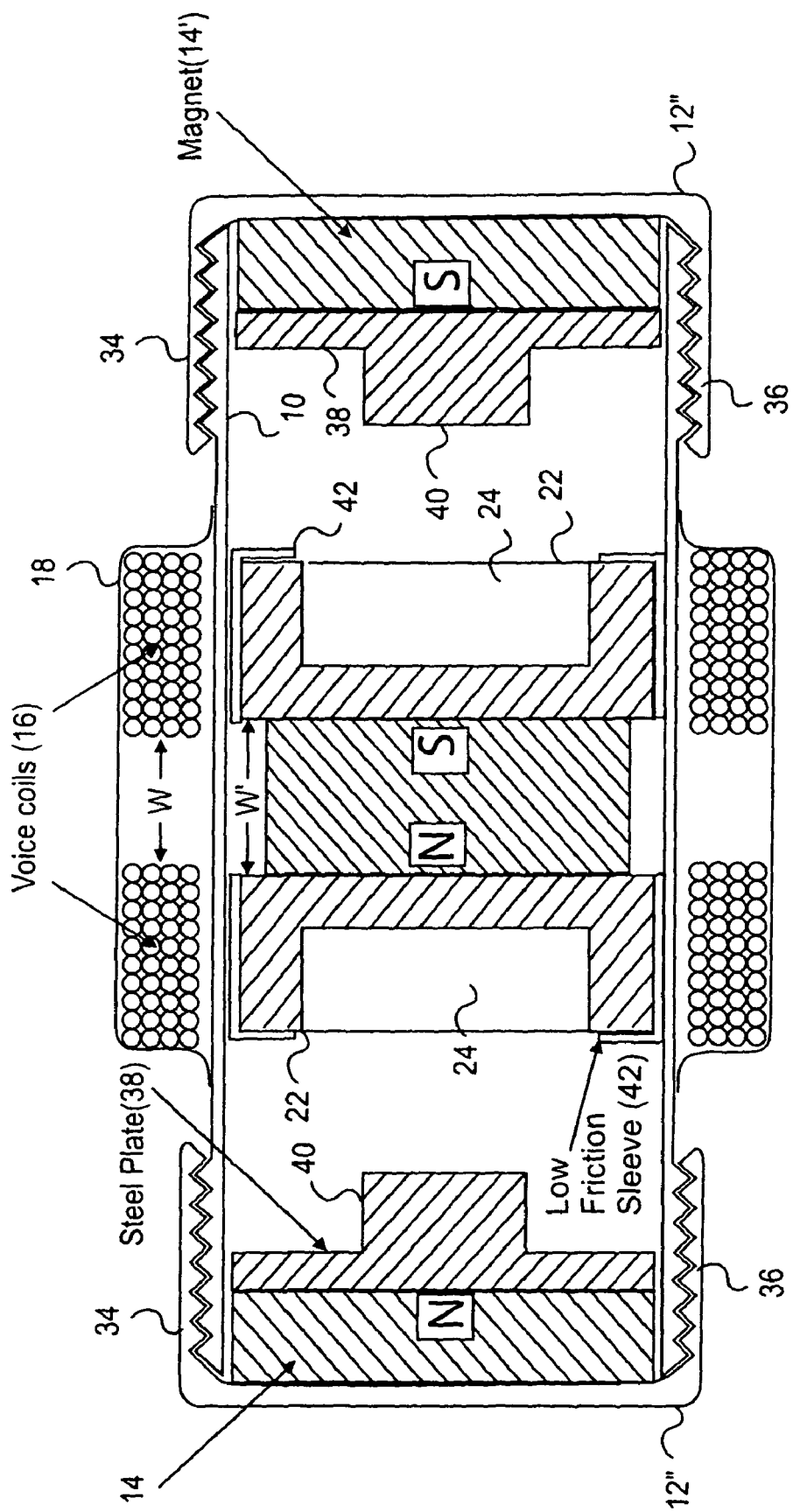
FIG. 4 is a longitudinal cross-section of a fourth embodiment of the present invention that is similar to the embodiment of FIG. 1.

Next, turning to FIG. 4 there is shown a longitudinal cross-section of a fourth embodiment of the present invention that is similar to the embodiment of FIG. 1 with several additions. Here, as has been done previously, the elements that are the same as those in FIG. 1 have been given the same reference numbers to avoid confusion.

One of the added features in this embodiment is the external treads 34 on the ends of tube 10 that mate with the internal treads 36 of end caps 12". The inclusion of threads 34 and 36 permit a fine adjustment of the position of end caps 12" and thus also end magnets 14 to equalize the magnetic strength exerted by each of end magnets 14 on the slider to accurately center the slider when at rest. Additionally, if the electromagnetic motor of the present invention is mounted vertically on one of end caps 12" or at an angle with one of end caps 12" lower than the other, the position of one or both end caps 12" has/have to be adjusted to also adjust the magnetic forces to counter for the weight of the slider with gravity tending to move the slider toward the lower of the end caps 12" and the corresponding magnet 14. The weight of the slider is not a problem when the electromagnetic motor is mounted in the horizontal position since the weight is not tending to position the slider closer to one of the ends of tube 10 since the weight vector of the slider is substantially perpendicular to the longitudinal axis between the ends of tube 10.

FIG. 4 also includes magnetically conductive end plates 38 (e.g., steel) on the internal side of end magnets 14. End plates 38 include a central extension, or plateau, 40 facing the hollow center 24 of slider plates 22. Plateau 40 can either be formed as an integral part of end plate 38, or it can be a thick circular piece of a magnetically conductive material that is either fastened to, or magnetically retained by, the larger diameter portion of plate 38 as shown in FIG. 4 substantially in the center thereof. The height of plateaus 40 is sufficient so that plateau 40 could extend at least partially into hollow center 24 of slider plate 22 as the slider approaches end plate 38 and before slider plate 22 comes into contact with end plate 38. With the inclusion of plateau 40 as part of end plates 38, the magnetic field of end magnet 14 is substantially concentrated in plateau 40. Thus, as the slider approaches the end magnet assembly, the magnetic field concentrated in plateau 40 interacts with the magnetic field of slider magnet 20 with a repelling force developed that is strongest between plateau 40 and a center region of slider plate 22 in hollow center 24. This concentration of the magnetic repelling force over an area that is smaller than the full diameter of slider plate 22 results in the generation of the repelling force sooner than if end plate 38 did not have plateau 40, or if end plate 38 was not present at all.

A third addition that is shown in FIG. 4 is the inclusion of a low friction sleeve 42 around the outer surface of each of slider plates 22 between slider plate 22 and the internal surface of tube 10. Low friction sleeves 42 reduce the energy necessary to move the slider from rest and to reverse direction of the slider by coils 16 when energized or the direction of current flow is changed. This will thus improve the performance of the electromagnetic motor of the present invention. If slider magnet 20 has a diameter that is substantially the same or lager than the diameter of slider plates 22, low friction sleeve 42 would also surround slider magnet 20.

Figure 5C:
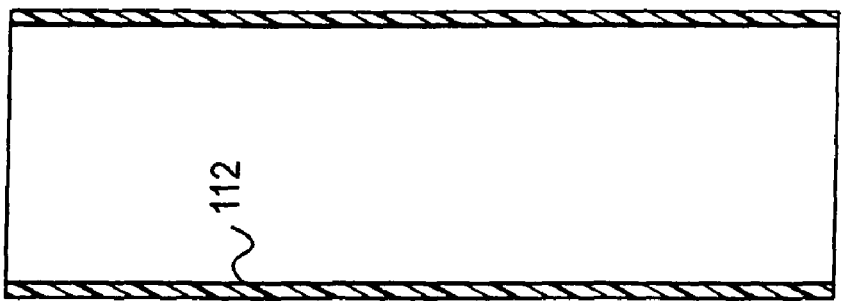
FIGS. 5A-C collectively are a longitudinal cross-section exploded view of a fifth embodiment of the present invention with the slider as the outer most component with FIG. 5B being the slider and FIG. 5C being an insulator sleeve that fits around the stator with the slider around the sleeve.
Figure 5A:
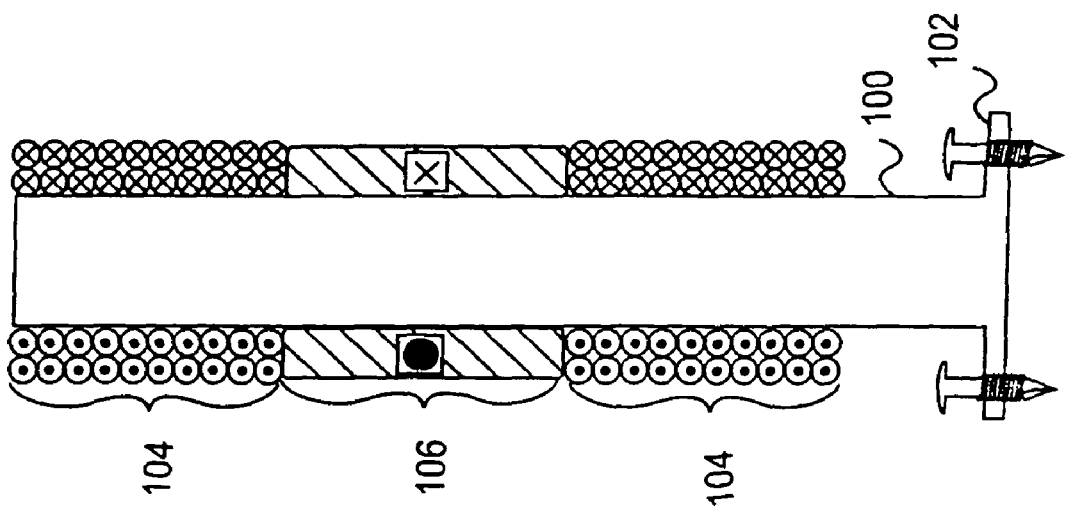
Figure 5B:
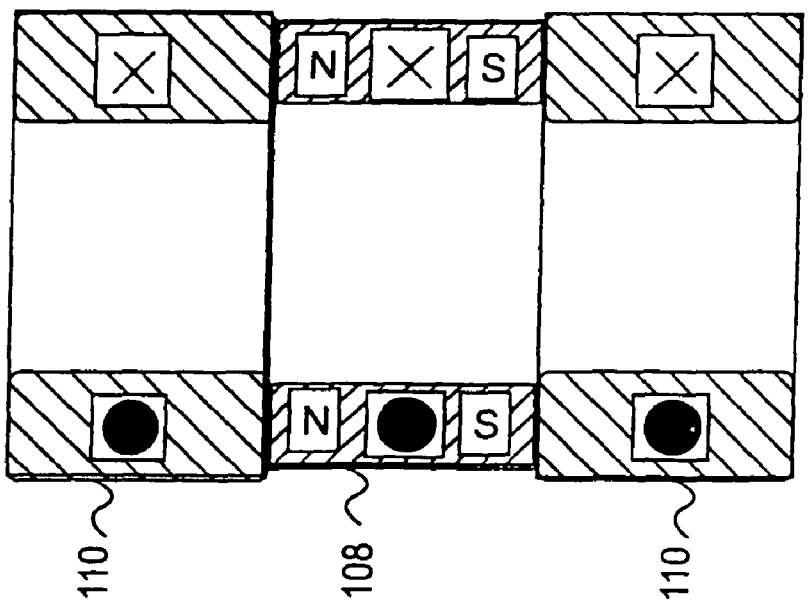

FIGS. 5A-C make up a horizontal cross-section exploded view of a fifth embodiment of the present invention with the slider (FIG. 5B) as the outer most component with the stator (FIG. 5A) surrounded by the slider. The stator is shown in the center and consists of an aluminum (or other non-ferrous material) mounting rod 100 that is vertically oriented in the view of FIG. 5A. At one end of rod 100 there is/are multiple mounting feet 102. Mounting feet 102 can take various shapes and include one or more elements. For example, feet 102 can be a circular flange that extends outward from post 100 or it can be multiple flanges that individually extend outward from post 100. Whatever shape mounting feet 102 take it/they provide an attachment means to a fixed surface. In FIG. 5A mounting foot/feet 102 is/are shown being screwed to a surface.

Wound horizontally around mounting post 100 are two coils 104, one at the top of post 100 and a second spaced apart a selected distance toward the bottom of post 100. Centered between coils 104 is ferro-magnetic metal ring 106 having a width substantially equal to the selected distance between coils 104. Metal ring 106 also surrounds post 100 horizontally in FIG. 5A. To assist in visualization of the orientation of coils 104 and ring 106 with respect to each other and post 100, an "X" has been placed on the right side of each of coils 104 and ring 106, and on the left a "•" has been placed on the left side of each of coils 104 and ring 106. If one were to consider a vector that follows the external surface of coils 104 and ring 106, with "x" indicating the starting point of the vector that extends into the page and the "•" indicates where the vector would exit the page, one can easily see that coils 104 and ring 106 are oriented horizontally, or stacked, so to speak on post 100.

To the left of the stator in FIG. 5A is the slider (FIG. 5B) of this embodiment. The slider has three components, a central ring magnet 108 with a ferro-magnetic ring 110 above and below ring magnet 108. Each of rings 110 and ring magnet 108 have a central diameter that is slightly large than the greater outer diameter of stator coils 104 or ring 106. Here it can be seen that each of rings 110 have the same height as the height of coils 104 of the stator, and ring magnet 108 has the same height as stator metal ring 106. Here the "X" and "•" are used on ring magnet 108 and rings 110 of the slider to illustrate each of those components as being a horizontally oriented rings.

To the right of the stator of FIG. 5A is a dielectric, low friction, non-ferrous sleeve 112 (FIG. 5C) that has an inner diameter that is large enough to permit placing sleeve 112 around coils 104 and ring 106 of the stator, while having an outer diameter that is smaller than the inner diameter of rings 110 and magnet 108 of the slider thus permitting the placement of the slider around sleeve 112 when in place around the stator. Sleeve 112 serves two purposes: as an electrical insulator to prevent shorting out coils 104 as the slider moves; and to provide a low friction surface to minimize the friction between itself and the slider during operation. The lower friction feature also permits starting and reversing the motion of the slider with less energy during operation. For convenience, sleeve 112 could be part of the slider with rings 110 and magnet 108 mounted on the outer surface of sleeve 112.

In FIG. 5D there is shown a horizontal cross-section assembled view of the embodiment of FIGS. 5A-C. FIG. 5D also shows, in dotted-outline to minimize confusion, a dust cap 114 in place enclosing the stator-slider assembly. Dust cover 114 can be made of many different materials, metal, plastic, etc. To minimize possible magnetic coupling between the dust cap, the selection of material for the dust cap would best be a non ferrous material. The use of a material that is also a dielectric would be of a further advantage to minimize the possibility of an electrical short, or spark between top coil 104 and the dust cap. The embodiment of FIGS. 5A-D also present the possibility of easy repair or replacement of constituent components if necessary.

The at rest position is that shown in FIGS. 5A-D and is achieved by magnetic attraction between magnet 108 and ferro-magnetic metal ring 106. When an electrical signal is applied to coils 104 an electromagnetic field is created that drives the slider up or down depending on the polarity of the electromagnetic field by magnetic interaction with magnet 108.

FIGS. 6A-D are horizontal cross-sections of exploded and assembled views of a sixth embodiment that is a modified version of the embodiment of FIGS. 5A-D. While sleeve 112 and dust cover 114 are not shown in FIGS. 6A and 6D, they have merely been omitted to more clearly show the detail of the modified features of this embodiment. As can be seen in both of FIGS. 6A and 6B, modified aluminum mounting rod 100' does not include mounting feet 102 as shown in FIGS. 5A and 5D. Instead a screw 102' extends out from the bottom of post 100' allowing mounting by screwing post 100' into the surface where the electromagnetic motor is to be located.

A second modification is in the inclusion of a flange 116 extending from the outer surface of one end of each of slider ferro-magnetic rings 110' with the inner diameter of flange 116 being slightly greater than the outer diameter of ring magnet 108. The flange 116 of each of slider ferro-magnetic rings 110', when rings 110' are mated with ring magnet 108, extending over a portion of the top and bottom ends of ring magnet 108 and provide more positive positioning of rings 110' relative to magnet 108.

Figure 7:
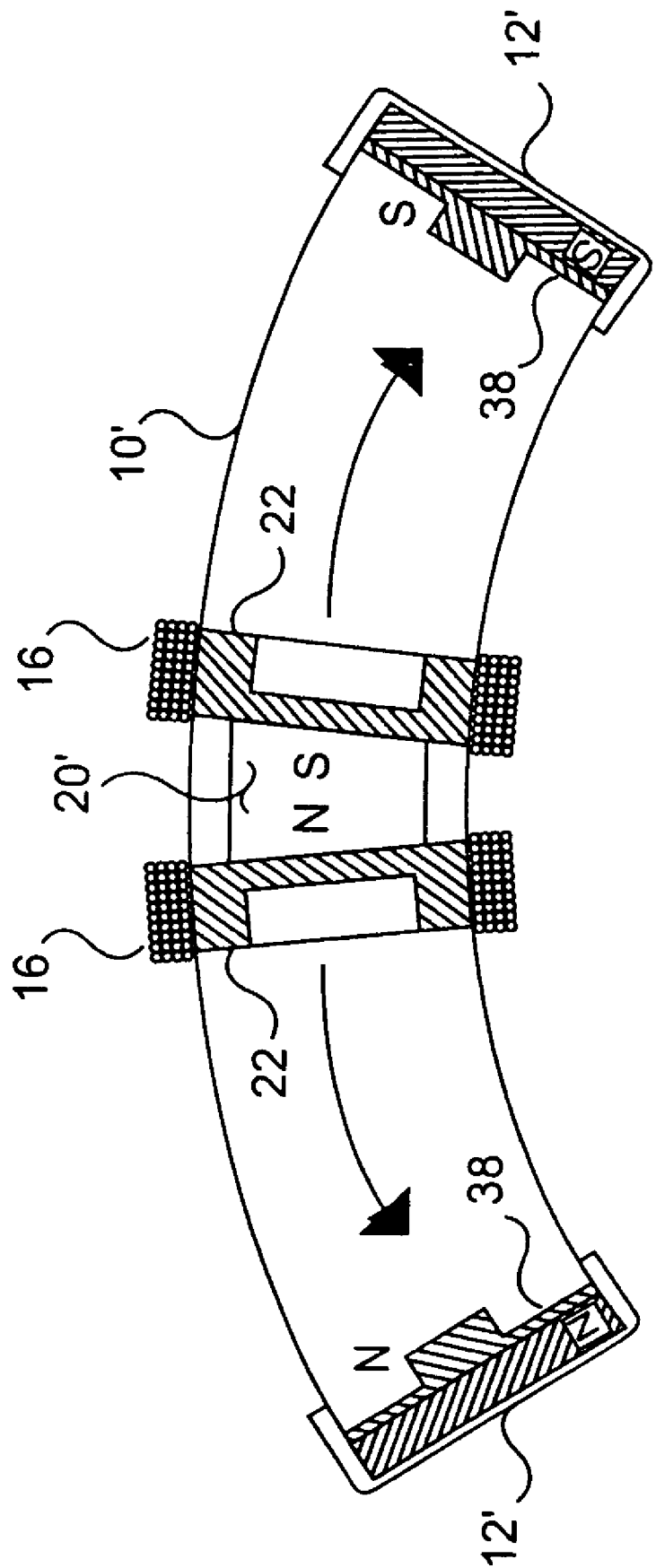
FIG. 7 is a longitudinal cross-section of a seventh embodiment of the present invention that is a modified version of the fourth embodiment of FIG. 4.

Next, in FIG. 7 there is shown a longitudinal cross-section of a seventh embodiment of the present invention that is a modified version of the fourth embodiment of FIG. 4, however the feature added here could be used with any tubular design of an electromagnetic motor, and a variation of this design can also be made to an external slider design, e.g., the embodiments of FIGS. 5A through 6D. The main thrust of this embodiment is the inclusion of a tube 10' that has a longitudinal cross-section in the shape of an arc. For external slider embodiments of FIGS. 5 and 6, post 100, ring 106 and coils 194 of the stator and magnet 108 and rings 110 of the slider would have to have the same degree of arc.

With tube 10' having an arc also requires a modification of the cross-sectional shape of the slider magnet 20' so that slider plates 22 and end plates 38 are substantially parallel to each other as the slider approaches, and substantially reaches, either end of tube 10'. To provide that substantially parallel interface of the plates at the ends of travel the cross-sectional shape of slider magnet 20' needs to be substantially that of a keystone, i.e., the line of the extended sides of magnet 20' are perpendicular to the inner surface of tube 10'. Coils 16 thus have to be placed so that the inner edge of each coils is parallel to each side of magnet 20'.

With tube 10' having the shape of an arc the electromagnetic motor of this embodiment is capable of producing vibration as well as a twisting motion of tube 10'. When small signal impulses are applied to coils 16 only vibration, produced by short travel distances of the slider, is experienced by the user since the internal rotation of the slider is very small and practically undetectable. With longer signal impulses applied to coils 16, the stator travels rotationally within tube 10' producing vibration of tube 10' as well as transferring a rotational component to tube 10'.

Given the magnetic poles of the three magnets oriented as shown in FIG. 7 (N to the left and S to the right) the slider develops a counter clockwise motion when moving to the left and clockwise motion when moving to the right relative to the longitudinal center of tube 10'. In special effect applications, this design makes a twisting force due to the moving mass of the slider with some of the energy of the rotation of the slider transmitted to tube 10'. When one end 12' is fastened to a fixed point and the other end 12' is fastened to something that permits at least some degree of rotational motion or is subject to some vibration, for example a chair, this design will induce a force on the chair that vibrationally rotates the chair in clockwise and counter-clockwise directions through a small angle as the slider moves within tube 10'. If incorporated in a game controller, this design will enhance special effects by vibrationally rotating the user's hand as the slider travels within tube 10'.

Figure 8:
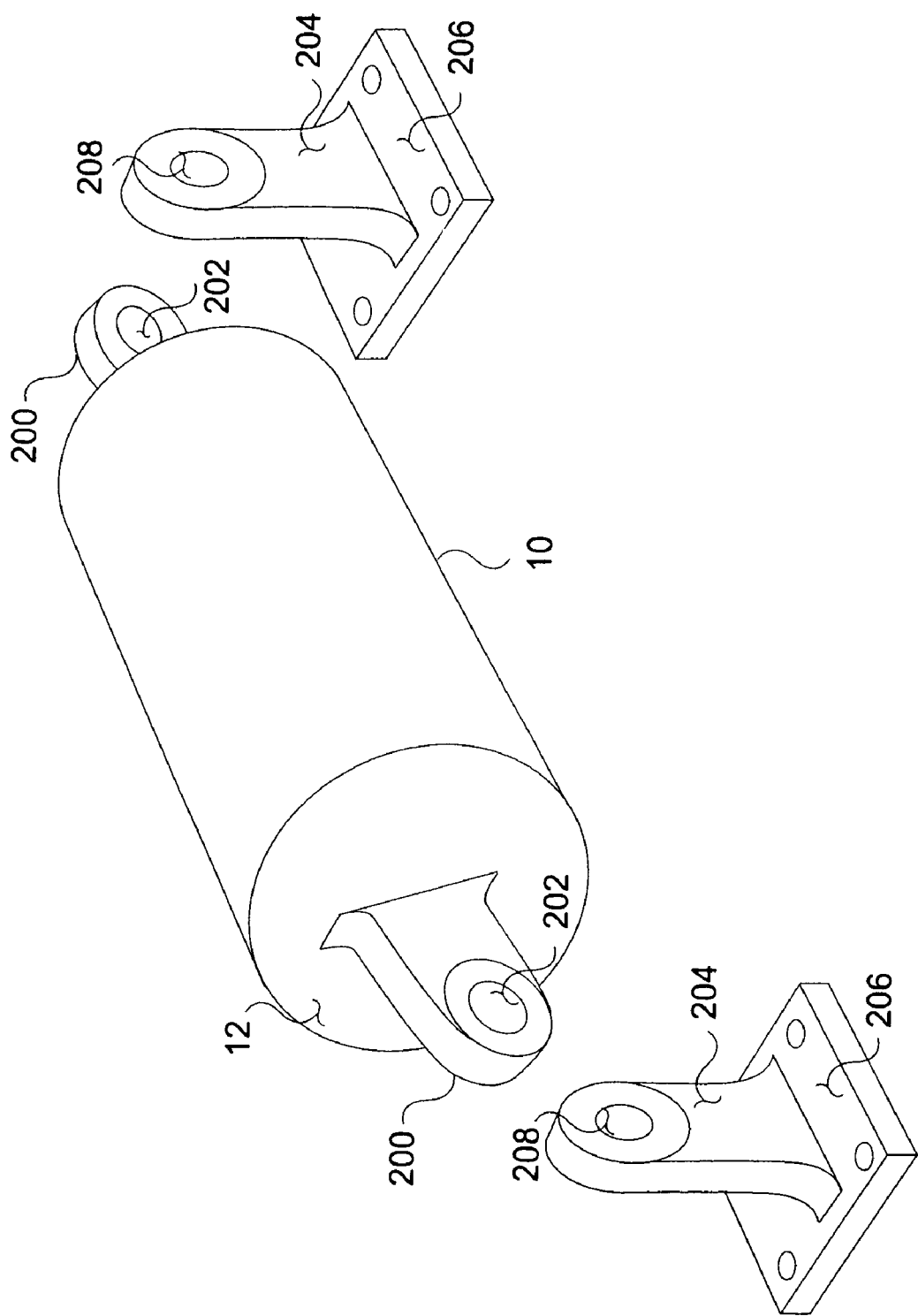
FIG. 8 is an exploded perspective view of a first example mounting technique for the electromagnetic motor of the present invention.

Referring next to FIG. 8 there is an exploded perspective view of a first example mounting technique for the electromagnetic motor of the present invention. This technique is particularly applicable where it is desirable to attach an electromagnetic motor between two points, e.g. those of FIGS. 1-4 and 7. For purposes of example the embodiment of FIG. 1 is used here with each of end caps 12 having affixed thereto an end bracket 200 that extends outward from end cap 12 with bracket 200 having an attachment hole 202 formed in the end of bracket 200.

To mate with end brackets 200 a pair of mounting brackets 204 are proved at opposite ends of tube 10 with each of mounting brackets 204 having an attachment hole 208 formed in the end of bracket 204. To attach mounting brackets 204 to a selected surface, each has a mounting flange 206 at the end opposite attachment hole 208, with flange 206 having mounting means formed therein. In the example of FIG. 8, screw or bolt holes are provided in each of flanges 206. To complete the installation, attachment holes 202 and 208 are aligned with each other and an attachment device (e.g. a bolt) passed between each of those holes and closed on opposite sides of brackets 200 and 204.

Figure 9A:
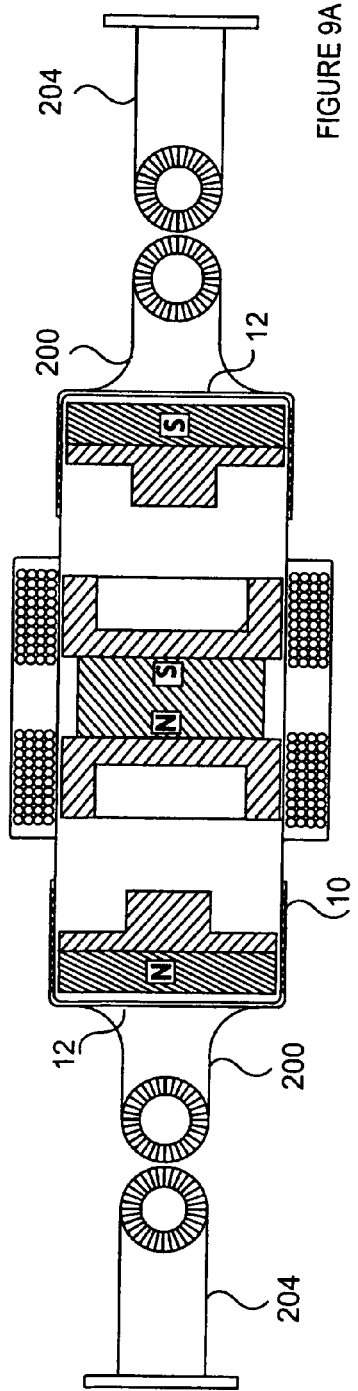
FIG. 9A shows a longitudinal cross-section of the electromagnetic motor of FIG. 4 equipped for mounting.
Figure 9B:
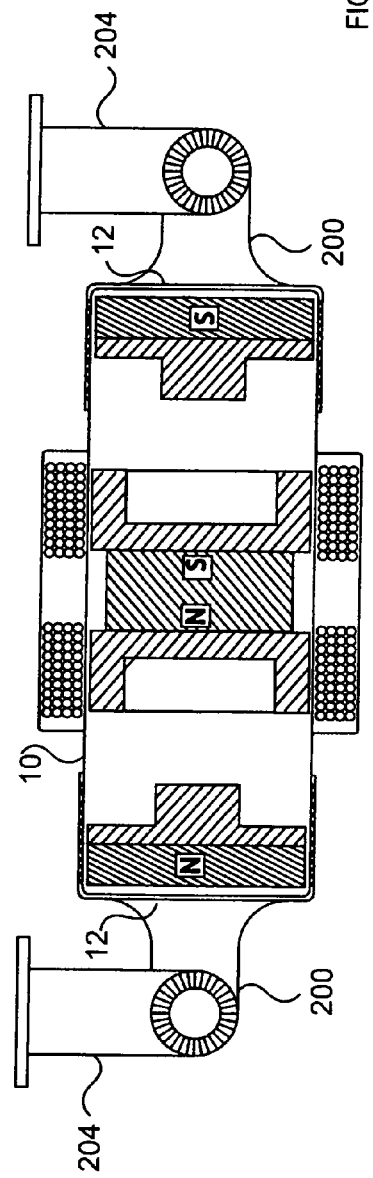
FIG. 9B shows a longitudinal cross-section of the electromagnetic motor of FIG. 4 mounted horizontally below a surface.
Figure 9C:
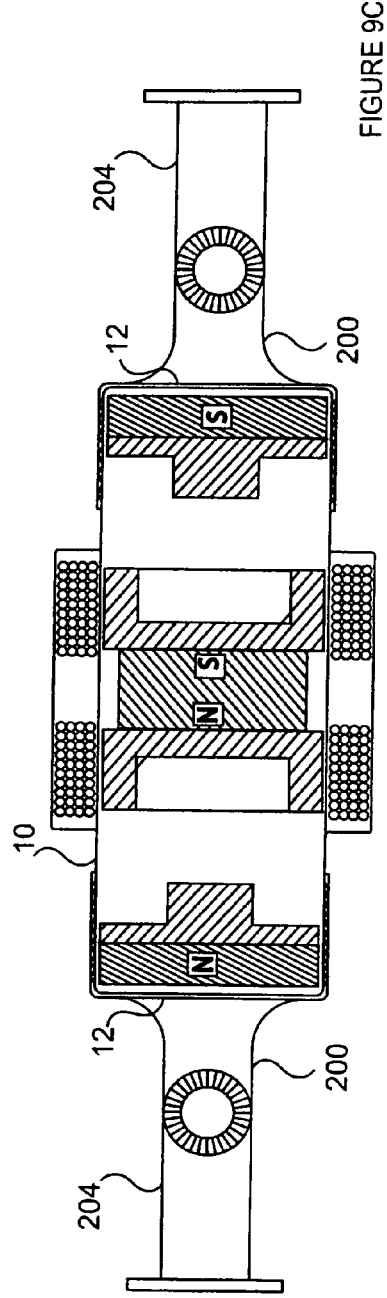
FIG. 9C shows a longitudinal cross-section of the electromagnetic motor of FIG. 4 mounted horizontally between two surfaces.

FIG. 9A shows a longitudinal cross-section of the electromagnetic motor of FIG. 4 equipped for mounting with brackets 200 and 204 as shown in FIG. 8. FIG. 9B shows a longitudinal cross-section of the electromagnetic motor of FIG. 4 mounted below a surface utilizing the mounting brackets of FIG. 8. Similarly, the motor could be mounted to a vertical surface. FIG. 9C shows a longitudinal cross-section of the electromagnetic motor of FIG. 4 mounted between two parallel surfaces utilizing the mounting brackets of FIG. 8. The orientation of brackets 200 and 204 at one end of the motor need not be the same as at the opposite end, e.g., one end could be mounted to a vertical surface while the other is mounted to a horizontal surface, in fact the two surfaces could be at any angle with respect to each other.

While the present invention has been shown and discussed in relation to several different embodiments, one skilled in the art could easily modify any of those embodiments and incorporate the unique features of the present invention in various other formats. Additionally, one could replace any number of the magnets shown in the various embodiments with coils capable of creating an electromagnetic field. In fact all magnetic fields of the present invention could be created with such a coil, including that of the slider when internal to the stator as in FIGS. 1-4 and 7, or the slider when external to the stator as in FIGS. 5A through 6D. Also, either or both of stator coils 16 or 104 shown in the embodiments of the present invention could be replaced with a magnet.

Figure 10:
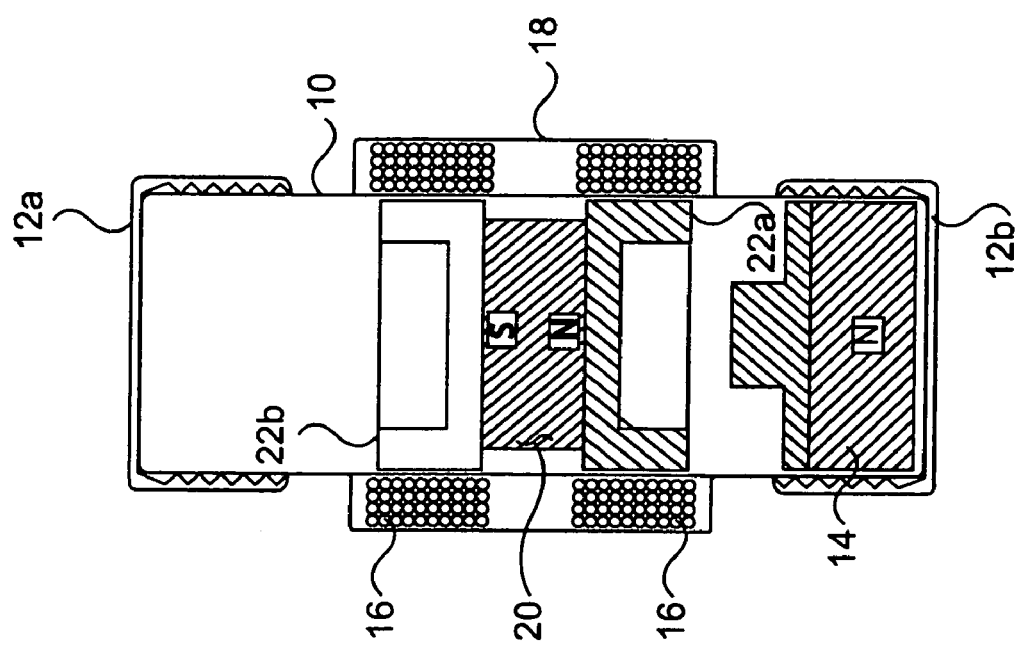
FIG. 10 is a longitudinal cross-section of an end mounted eighth embodiment of the present invention that has fewer components than the embodiments of previous figures.

FIG. 10 is a longitudinal cross-section of an end mounted eighth embodiment of the present invention that has fewer components than the embodiments discussed previously. Here the stator consists of tube 10, spaced apart electromagnetic coils 16 wound on the outside of tube 10, cover 18 for coils 16, top end cap 12a, bottom end cap 12b and an end magnet 14 within bottom end cap 12b. The slider consists of a slider magnet 20, a bottom slider plate 22a magnetically retained by the lower side of magnet 20, and a top slider plate 22b magnetically retained by the upper side of magnet 20. At rest the slider is as shown in FIG. 10 with each of slider plates 22a and 22b opposite a different one of coils 16 which are spaced apart from each other by a distance that is substantially the same as the thickness of slider magnet 20 as in previous embodiments.

As one can see this embodiment only includes only two magnets. In this embodiment when coils 16 are energized they cause the slider to move up or down in the same way as in previously discussed embodiments where the slider moves left or right. In this embodiment, when the slider is driven upward there is no top magnet to repel the slider downward. Here the downward return force is provided by the combination of gravitation pull and the weight of the slider. When the slider is driven downward by coils 16, lower end magnet 14 proves a repelling force to push the slider upward. In this embodiment, the weight of the slider has to be balanced by the strength of lower end magnet 14 otherwise the same strength of the fields provided to drive the slider up may not be the same as to drive the slider downward. To compensate for any imbalance, lower magnet 14 could be moved closer to or further away from bottom plate 22a of the slider as necessary. If there is insufficient adjustment available for moving lower end magnet 14 a sufficient distance, coils 16 will have to be always activated at a base signal level to support the slider in the at rest position shown in FIG. 10 when no force is needed to move the slider either up or down, and when movement is desired, the necessary signal to provide the distance of movement will have to be combined with the base signal level which will result to either increase, decrease or reverse the total signal applied to coils 16. Alternately, a third external coil could be substituted for lower end magnet 14. In doing so the strength adjustment for the magnet substitute coil could easily be accomplished by adjusting the steady state current applied to the magnet substitute coil without having to deal with a background signal applied to coils 16 for centering the slider.

Figure 11:
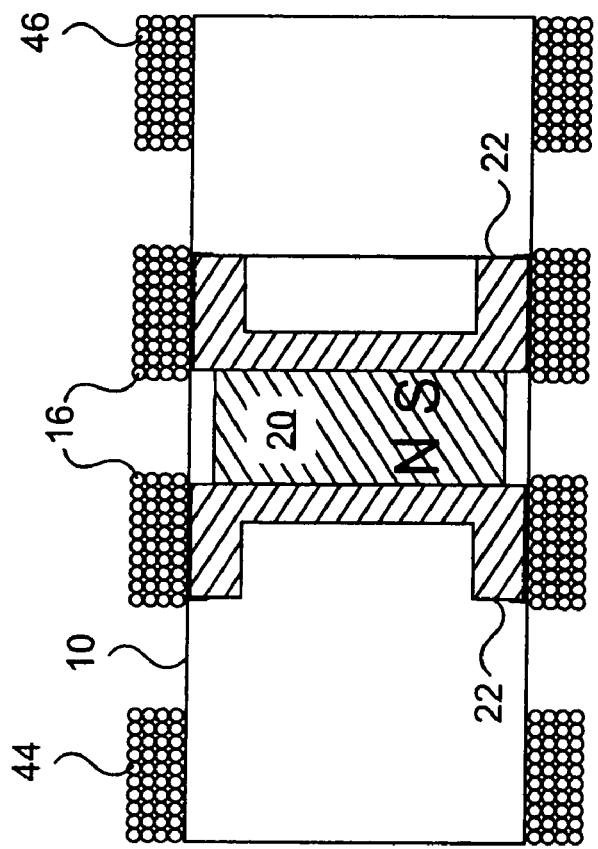
FIG. 11 is a longitudinal cross-section of a ninth embodiment of the present invention that is a single magnet modified embodiment of that of FIG. 4.

The ninth embodiment of the present invention is shown in FIG. 11 which is a longitudinal cross-section of that embodiment which is a modified embodiment of that of FIG. 4. In this embodiment, the slider includes slider magnet 20 and slider plates 22 as in previously discussed embodiments. The stator includes tube 10 and coils 16, and in place of end magnets 14 as in the previously discussed embodiments, magnet substitutes in the form of coils 44 and 46 are wound at opposite ends of tube 10 to create a constant electromagnetic field to simulate the field of the magnets being replaced, in this view an S pole field on the right and a N pole field on the left. To adjust and balance the electromagnetic fields at the ends of tube 10 the steady state signal applied to either or both of coils 44 and 46 can be adjusted.

Figure 12:
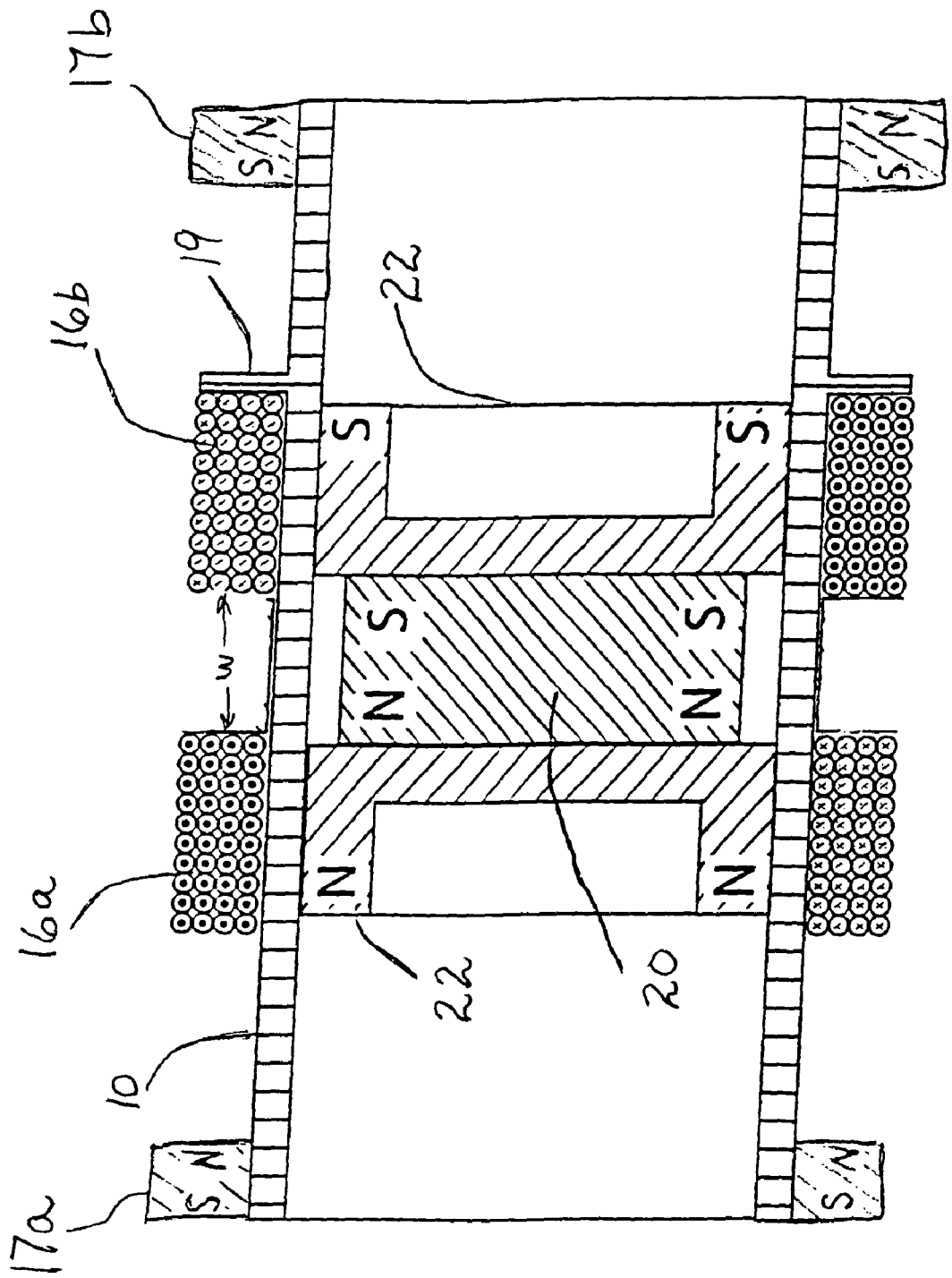
FIG. 12 is a longitudinal cross-section of a tenth embodiment of the present invention that is similar to each of FIGS. 1 and 11.

FIG. 12 illustrates a simplified view of a tenth embodiment of the present invention in a longitudinal cross-sectional view of the electromagnetic motor. This embodiment is similar to the embodiments of each of FIGS. 1 and 11 in that it includes external permanent magnets 17a and 17b at opposite ends of tube 10 as opposed to internal magnets 14 at each end of tube 10 as in the embodiment of FIG. 1 and as opposed to external end magnets 44 and 46 as in the embodiment of FIG. 11. This embodiment could also incorporate the curved tube 10' as in the embodiment of FIG. 7. As in each of the other embodiments of the present invention discussed above, this embodiment functions in a similar manner.

In FIG. 12 the ends of tube 10 are shown open, however a non-ferrous cap can be placed on each end to prevent foreign material from entering tube 10 which could imped the free movement of the slider.

Additionally, the stator includes, wound on the outside of tube 10 and spaced apart a first selected distance from each other relative to a selected position on tube 10 (for convenience of illustration in FIG. 12, on either side of the longitudinal center of tube 10) are wire coils 16a and 16b with wire coil 16b wound in the opposite direction to wire coil 16a. Further, the stator includes a pair of circular (doughnut shaped) magnets 17a and 17b mounted externally on tube 10 toward opposite ends of tube 10, each a second selected distance from the closest side of the nearest of wire coils 17a and 17b (for convenience, in this view at opposite ends of tube 10) with the center diameter of magnets 17a and 17b being approximately the same as the outer diameter of tube 10.

While in FIG. 12, the position of wire coils 16a and 16b and magnets 17a and 17b have been describe relative to the longitudinal center of tube 10, depending on the application of this embodiment of the present invention and the method of mounting and interconnecting with the item to be vibrated may require that the one or more of the ends of tube 10 extend beyond one or both of magnets 17a and 17b thus the position of magnets 17a and 17b has been describe relative wire coils 16a and 16b, and wire coils 16a and 16b relative to each other. Thus in some applications wire coils 16a and 16b, and magnets 17a and 17b may not be spaced relative to the center of the tube as shown in FIG. 12. The important spacing for the present invention is the spacing of wire coils 16a and 16b and magnets 17a and 17b relative to each other and not necessarily relative to the center and ends of tube 2. Additionally, in some applications, the spacing between coil 16a and magnet 17a may have to be different from the spacing of between coil 16b and magnet 17b to achieve the desired vibration pattern.

Additionally, the desired vibration pattern for particular applications may also, or alternatively, require that the magnitude of the flux of permanent magnets 17a and 17b be different from each other.

Also shown in FIG. 12 is flange 19 molded as a part of tube 10 as a guide to the proper placement of coil 16b on the exterior of tube 10 with the height of flange 19 also being selected to represent the desired height of coil 16b. Once coil 16b is in place, then coil 16a can be placed on tube 10 the desired distance W from coil 16b. A discussion of the selection of distance W is included above in the above discussion of FIG. 1.

Figure 13:
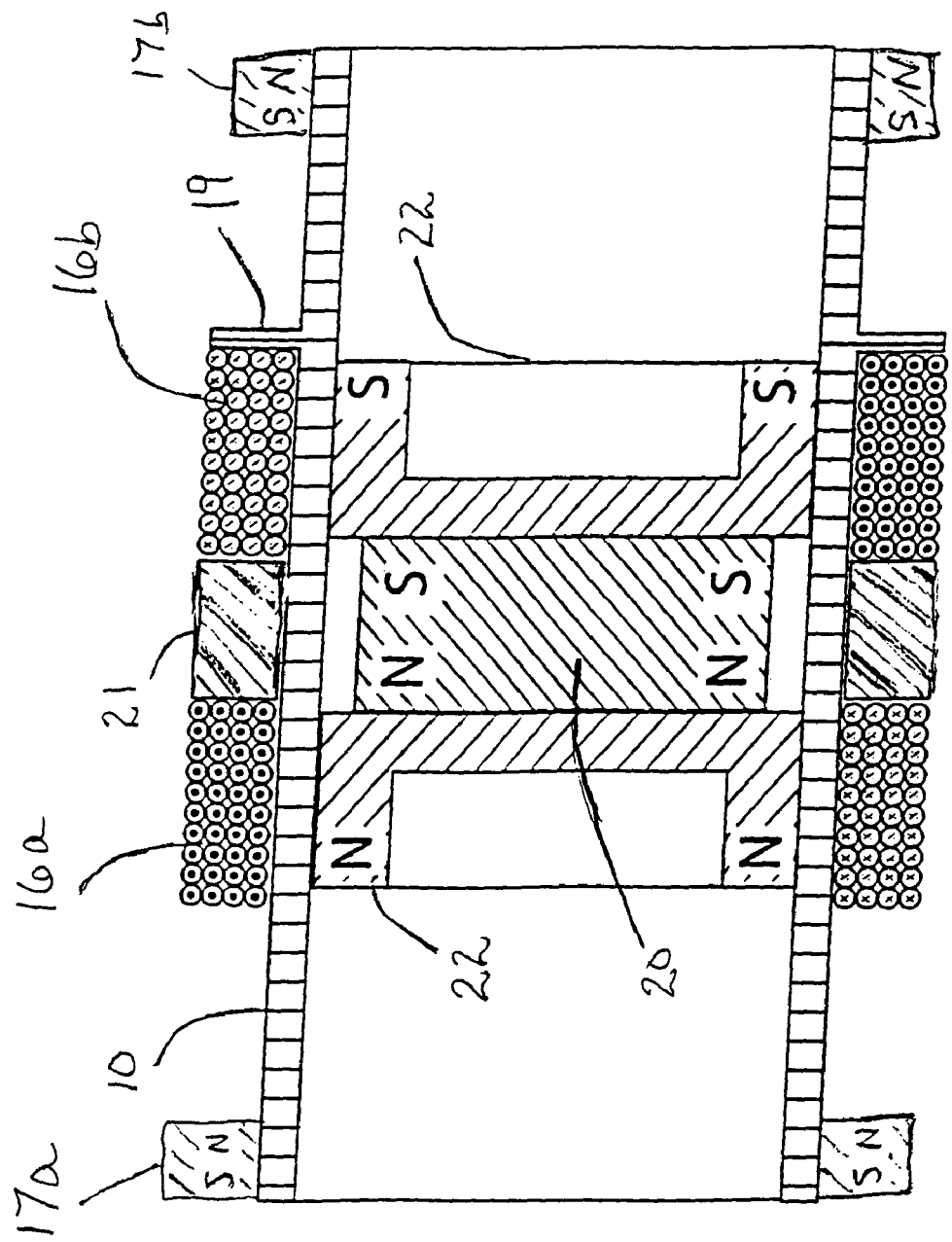
FIG. 13 includes an enhancement of the tenth embodiment of FIG. 12.

FIG. 13 is an extension of the tenth embodiment of FIG. 12 with the addition of a non-ferrous spacer 21 between coils 16a and 16b. The use of spacer 21 in conjunction with flange 19 will assist in placement of coil 16a the desired spacing from coil 17b and in maintaining that spacing when the vibrator is in operation.

Figure 14:
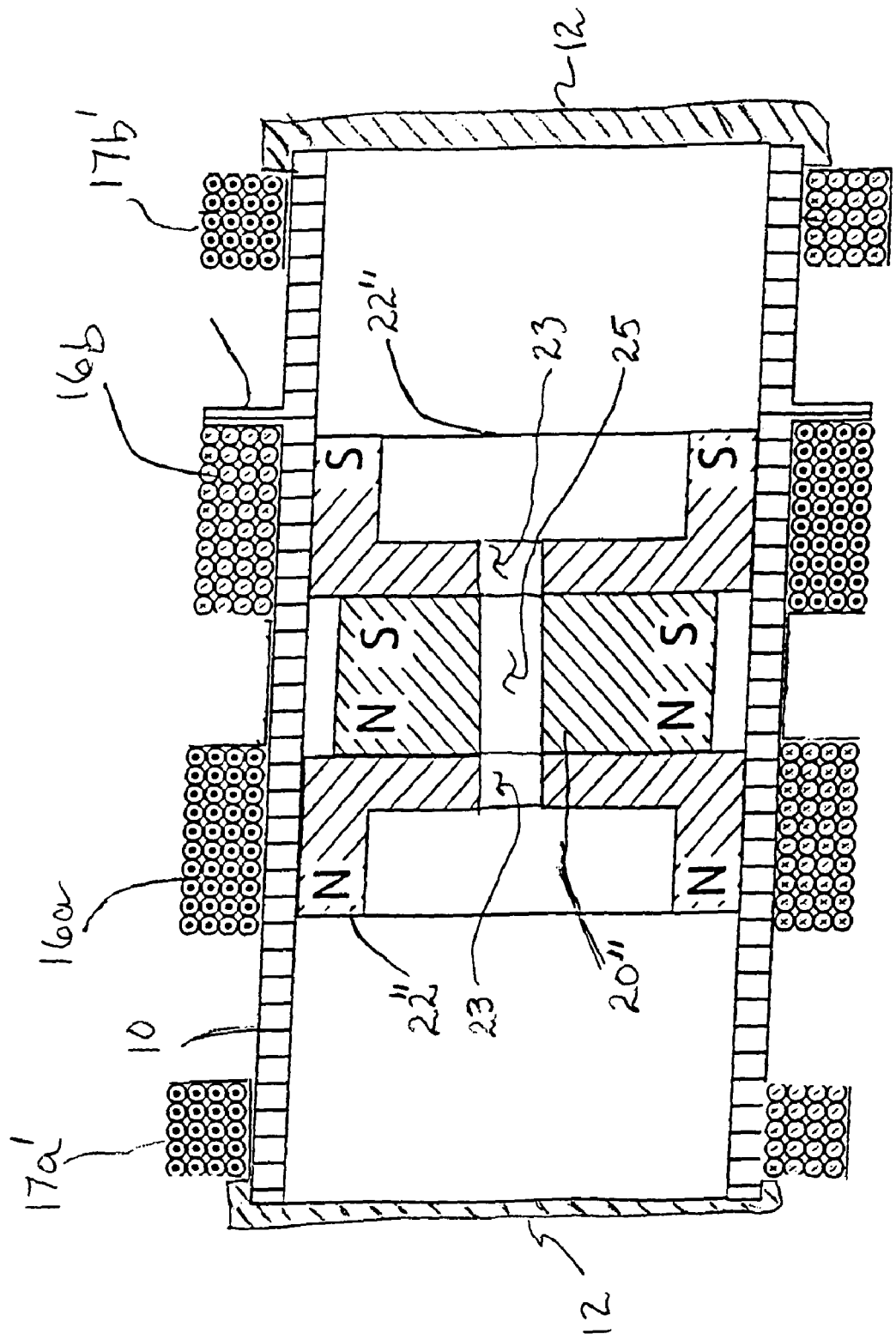
FIG. 14 includes several variations on the tenth embodiment of FIG. 12.

FIG. 14 includes three variations on the embodiment of the present invention illustrated in FIG. 12. One optional modification is the replacement of stator end magnets 17a and 17b with coils 17a' and 17b', respectively, both wound in the same direction to function with the same polarity as magnets 17a and 17b. The use of coils 17a' and 17b' offers the possibility of having electromagnetic signals of the same polarity and different intensities at opposite ends of tube 10. This may be necessary if tube 10 is mounted other than horizontally to compensate for the weight of the slider, or in some applications where it is desirable to have a stronger repelling force between the slider and one end of tube 10.

A second optional variation might be the need for the inclusion within tube 10 of a fluid, other than air. Perhaps such a fluid might be needed for cooling the slider to prevent overheating. Another possibility for the inclusion of a fluid within tube 10 is to provide damping of the movement of the slider to make for smoother operation. To enclose tube 10 end caps 12 are shown in FIG. 14 to enclose tube 10.

The third optional variation is an extension of the second option where a fluid or gas (e.g., nitrogen, water, oil, alcohol, etc.) is enclosed in tube 10, and might even be desirable when the environment inside tube 10 is air. As plates 22 above have been described as close fitting within tube 10 to minimize wobble of the slider, when the slider is in a fluid environment, at passage through the slider for the fluid may be need to not overly impede movement of the slider. To illustrate such fluid passages, plates 22" have each been shown here with a hole 23 through them with holes 23 in line with a hole 25 through the center of slider magnet 20". Such holes need not necessarily be through the center of plates 22" and magnet 20", there could be multiple holes radially through plates 22" and magnet 20".

In the foregoing discussion the shape of tube 10 has been indirectly identified as having an interior diameter inferring a circular interior cross-sectional opening for convenience of discussion and as that is probably the most likely shaped that would be employed. However tube 10 will function substantially in the same way with any of numerous other shapes that the application may require: oval, triangular, square, diamond, pentagonal, hexagonal, n-agonal where n is 3 or greater, or even a complex shape with a plurality of curved and straight segments (e.g., rectangular with concave or convex ends, the outline of two or more intersecting circles or other shapes, rectangular with ends that are the outline of two or more intersecting circles or other shapes, etc.).

There are also other combinations of devices capable of creating a magnetic field that could be utilized and after seeing the features of the present invention one skilled in the art could create equivalent configurations that include the features of the present invention. Therefore it is intended that the present invention only be limited by the claims, and equivalents upon which the claims can be read.

What is claimed is:

1. An electromagnetic motor comprising:
    a stator having:
        a non-ferrous tube of a selected axial length having a first end and a second end;
        first and second stator magnetic flux producing elements surrounding said tube and spaced apart from each other a first axial distance with each of said first and second stator elements on an opposite side of a selected point on said tube between said first and second ends of said tube closest to, and spaced apart from, a correspondingly numbered end of said tube with each of said first and second stator magnetic flux producing elements disposed to direct a magnetic flux axially within said tube in the direction of said first and second ends within said tube; and
        a third stator magnetic flux producing element surrounding said tube spaced apart a second axial distance from a closest side of said first stator magnetic flux producing element toward said first end of said tube wherein said second axial distance is greater than said first axial distance with said third stator magnetic flux producing element providing magnetic flux axially along the axis of the tube of a selected polarity;
        a fourth stator magnetic flux producing element surrounding said tube spaced apart a third axial distance from a closest side of said second stator magnetic flux producing element toward said second end of said tube wherein said third axial distance is greater than said first axial distance with said fourth stator magnetic flux producing element providing magnetic flux axially along the axis of the tube of the same selected polarity as said third stator magnetic flux producing element;
    and
    a slider disposed to move axially within said tube between said first and second ends, said slider includes a slider magnetic flux producing element having a first and a second side and a width with respect to the axis of the tube that is substantially equal to said first axial distance with said slider magnetic flux producing element providing magnetic flux axially along the axis of the tube of an opposite polarity to said selected polarity of said third and fourth stator magnetic flux producing elements;
    wherein an at rest position of said slider magnetic flux producing element is substantially centered relative to a center of the first axial distance between said first and second stator magnetic flux producing elements.

2. The electromagnetic motor of claim 1 wherein said first and second stator magnetic flux producing elements are a pair wire coils wrapped around said tube.

3. The electromagnetic motor of claim 1 wherein said slider magnetic flux producing element is a permanent magnet.

4. The electromagnetic motor of claim 1 wherein each of said third and fourth stator magnetic flux producing elements is a permanent magnet.

5. The electromagnetic motor of claim 1 wherein the strength of the magnetic flux produced by each of said third and fourth stator magnetic flux producing elements is of sufficient strength to return said slider to, and maintain said slider at, said at rest position when said first and second stator flux producing elements are inactivated.

6. The electromagnetic motor of claim 5 wherein the strength of the magnetic flux produced by each of said third and fourth stator magnetic flux producing elements is substantially equal.

7. The electromagnetic motor of claim 6 wherein, in an over damped situation, the strength of the magnetic flux produced by each of said third and fourth magnetic flux producing elements is greater than the strength of the magnetic flux produced by said slider magnetic flux producing element.

8. The electromagnetic motor of claim 6 wherein, in a critically damped situation, the strength of the magnetic flux produced by each of said third and fourth magnetic flux producing elements is substantially the same as the strength of the magnetic flux produced by said slider magnetic flux producing element.

9. The electromagnetic motor of claim 6 wherein, in an under damped situation, the strength of the magnetic flux produced by said slider magnetic flux producing element is greater than the magnetic flux produced by each of said third and fourth magnetic flux producing elements.

10. The electromagnetic motor of claim 1 wherein:
said slider magnetic flux producing element is a slider magnet having first and second sides and an edge surface that is smaller than an internal cross-sectional shape of said tube perpendicular to the axis thereof wherein said edge surface is substantially parallel to an inner surface of said tube;
said slider further comprises first and second magnetically conductive plates each of a selected thickness and edge shape that is substantially the same as the internal cross-sectional shape of said tube perpendicular to the axis thereof and a dimension that is smaller than internal dimensions of said tube, wherein:
a first side of said first magnetically conductive plate is adhering to said first side of said slider magnet with a second side of said first magnetically conductive plate facing said first end of said tube; and
a first side of said second magnetically conductive plate is adhering to said second side of said slider magnet with a second side of said second magnetically conductive plate facing said second end of said tube.

11. The electromagnetic motor of claim 10 wherein said second side of each of said first and second magnetically conductive plates defines therein a centrally located cavity of a selected depth and a lateral dimension that is smaller than said edge dimensions of the corresponding one of said first and second magnetically conductive plates.

12. The electromagnetic motor of claim 10 each of said slider magnet and said first and second magnetically conductive plates has defined therethrough at least one mating passage for said gas or fluid to pass therethrough as said slider moves within said tube.

13. The electromagnetic motor of claim 1 wherein said tube has a substantially constant lateral shape and size throughout the entire length thereof.

14. The electromagnetic motor of claim 13 wherein said tube is substantially straight throughout the entire length thereof.

15. The electromagnetic motor of claim 13 wherein said tube is arcuate throughout the entire length thereof.

16. The electromagnetic motor of claim 15 with said tube having an arcuate shape wherein movement of said slider within said tube results in rotational motion of said tube in a clockwise direction when said slider approaches one of said first and second ends of said tube and in a counter-clockwise direction when said slider approaches a second of said first and second ends of said tube.

17. The electromagnetic motor of claim 1 wherein:
said third stator magnetic flux producing element delivers magnetic flux of a first substantially constant strength:
said fourth stator magnetic flux producing element delivers magnetic flux of a second substantially constant strength;
said slider magnetic flux producing element delivers a magnetic flux of a third substantially constant strength; and
said first and second stator magnetic flux producing elements each produce magnetic flux of varying strength and of opposite polarity to each other in response to a signal applied to each of them;
said slider movement within said tube results from interaction of said varying strength and polarity of flux from said first and second stator magnetic flux producing elements and said first and second constant strength flux from each of said third and fourth stator magnetic flux producing element with said third constant strength flux from said slider magnetic flux.

18. The electromagnetic motor of claim 17 wherein said motion of said slider mirrors said signal applied to said first and second stator magnetic flux producing elements.

19. The electromagnetic motor of claim 18 wherein when said tube is mounted in a fixed position movement of said slider within said tube creates vibration of said tube with the direction and strength directly proportional to the strength and pattern of said signal applied to said first and second stator magnetic flux producing elements.

20. The electromagnetic motor of claim 19 wherein when a known preexisting undesired vibration exists at said fixed position, said signal can be generated to cause said slider to move in a reverse pattern to substantially cancel said undesired vibration.

21. The electromagnetic motor as in claim 17 wherein, when no signal is applied to said first and second stator magnetic flux producing elements, interaction of magnetic flux from said third and fourth stator magnetic flux producing elements from opposite sides of said slider and magnetic flux from said slider magnetic flux producing element causes said slider to locate to said at rest position where equilibrium is reached between the magnetic force on said first and second sides of said slider.

22. The electromagnetic motor of claim 17 wherein a repelling force from each of said third and fourth stator magnetic flux producing elements on said slider varies linearly, increasing as said slider moves closer to and decreasing as said slider moves further away from, the first and second ends of the tube.

23. The electromagnetic motor of claim 17 wherein said first substantially constant strength of the third stator magnetic flux producing element magnetic flux is substantially equal to said second substantially constant strength of the fourth stator magnetic flux magnetic flux.

24. The electromagnetic motor of claim 1 wherein each of said third and fourth stator magnetic flux producing elements is a wire coil wrapped around said tube.

25. The electromagnetic motor of claim 24 wherein the strength of the magnetic flux produced by each of said third and fourth stator magnetic flux producing elements is substantially equal.

26. The electromagnetic motor of claim 24 wherein the strength of the magnetic flux produced by each of said third and fourth stator magnetic flux producing elements is independently selectable.

27. The electromagnetic motor of claim 1 where the stator further includes a first and second end cap closing a correspondingly numbered end of said tube.

28. The electromagnetic motor of claim 27 wherein said tube further includes one of a gas or fluid filing interior portions of the tube not occupied by said slider.

29. The electromagnetic motor of claim 28 wherein said slider has defined therethrough at least one passage for said gas or fluid to pass therethrough as said slider moves within said tube.

30. The electromagnetic motor of claim 29 wherein said slider magnetic flux producing element is a slider magnet.

31. The electromagnetic motor of claim 1 wherein said second and third axial distances are substantially equal.

32. The electromagnetic motor of claim 1 wherein said tube has a consistent selected interior cross-sectional shape perpendicular to the axial length of the tube.

33. The electromagnetic motor of claim 32 wherein said interior cross-sectional shape is one of circular, oval, n-agonal where n is 3 or greater and complex.

* * * * *